United States Patent
Kim

(10) Patent No.: US 11,927,221 B2
(45) Date of Patent: Mar. 12, 2024

(54) CONNECTION PLATE AND TRAVELING BODY FOR DOZER INCLUDING THE SAME

(71) Applicant: HD HYUNDAI INFRACORE CO., LTD., Incheon (KR)

(72) Inventor: Jaehyuk Kim, Incheon (KR)

(73) Assignee: HD HYUNDAI INFRACORE CO., LTD., Incheon (KR)

(*) Notice: Subject to any disclaimer, the term of this patent is extended or adjusted under 35 U.S.C. 154(b) by 0 days.

(21) Appl. No.: 17/713,343

(22) Filed: Apr. 5, 2022

(65) Prior Publication Data
US 2022/0316531 A1  Oct. 6, 2022

(30) Foreign Application Priority Data
Apr. 5, 2021 (KR) .................. 10-2021-0044075

(51) Int. Cl.
*E02F 9/02* (2006.01)
*B62D 55/13* (2006.01)
*F16D 1/06* (2006.01)

(52) U.S. Cl.
CPC ............ *F16D 1/06* (2013.01); *B62D 55/13* (2013.01); *E02F 9/02* (2013.01)

(58) Field of Classification Search
CPC ......... E02F 9/02; B62D 55/13; B62D 55/125; B62D 55/12; F16D 1/06
See application file for complete search history.

(56) References Cited

U.S. PATENT DOCUMENTS

| | | | |
|---|---|---|---|
| 6,883,876 B2* | 4/2005 | Yamamoto | B62D 55/088 305/196 |
| 7,823,990 B2* | 11/2010 | Angot | B62D 55/20 305/195 |
| 11,059,530 B2* | 7/2021 | Sho | B62D 55/08 |
| 2005/0145422 A1* | 7/2005 | Loegering | B62D 55/305 180/9.26 |
| 2007/0029878 A1* | 2/2007 | Gaudreault | E02F 9/02 305/130 |
| 2011/0049975 A1* | 3/2011 | Mulligan | B62D 55/12 305/202 |
| 2013/0038119 A1* | 2/2013 | Griffith | B62D 55/13 29/525.01 |
| 2014/0333125 A1* | 11/2014 | Hoyt | B62D 55/32 29/893 |
| 2015/0321709 A1* | 11/2015 | Sewell | B62D 55/12 305/120 |
| 2019/0023335 A1* | 1/2019 | Blindt | F16H 55/30 |

FOREIGN PATENT DOCUMENTS

| WO | WO-2020120972 A1 * | 6/2020 | ............. B62D 55/06 |
|---|---|---|---|
| WO | WO-2020251449 A1 * | 12/2020 | ............. B62D 55/13 |

* cited by examiner

*Primary Examiner* — Minnah L Seoh
*Assistant Examiner* — Ryan Edward Hardy
(74) *Attorney, Agent, or Firm* — Hauptman Ham, LLP

(57) ABSTRACT

An embodiment of the present disclosure relates to a connection plate, which is disposed between a drive unit configured to provide power to a traveling body for a dozer and a sprocket configured to rotate by receiving power of the drive unit, the connection plate including a body having a through-hole in which one region of the drive unit is penetratively disposed, a first support portion formed at one side of the body and configured to support the sprocket, and a second support portion formed at the other side of the body and configured to support the drive unit.

10 Claims, 4 Drawing Sheets

CONNECTION PLATE AND TRAVELING BODY FOR DOZER INCLUDING THE SAME

CROSS-REFERENCE TO RELATED APPLICATIONS

This application claims benefit and priority to Korean Patent Application No. 10-2021-0044075, filed on Apr. 5, 2021, with the Korean Intellectual Property Office, the disclosure of which is incorporated herein in its entirety by reference.

TECHNICAL FIELD

An embodiment of the present disclosure relates to a connection plate and a traveling body for a dozer including the same, and more particularly, to a connection plate disposed between a sprocket and a drive unit of a dozer to improve a degree of freedom in assembling the sprocket and effectively transmit power from the drive unit to the sprocket, and a traveling body for a dozer including the same.

BACKGROUND

In general, a traveling body for a dozer has a track having shoes being in contact with the ground surface and guides the traveling of the dozer. In addition, in the traveling body for a dozer, a drive unit and a sprocket are connected directly. Specifically, an inner peripheral surface of the sprocket is coupled directly to an outer peripheral surface of the drive unit, such that power of the drive unit is transmitted to the sprocket.

In the related art, when a component between the sprocket and the drive unit is damaged, the entire drive unit needs to be replaced. For this reason, there are problems in that a large amount of cost and time are required to replace the drive unit and working efficiency of the dozer deteriorates. Specifically, because the dozer is a construction machine that perform a large amount of work in an environment exposed to the outside, the state of the uneven ground surface may cause damage to the traveling body for a dozer.

Because the sprocket and the drive unit are coupled directly to each other, there is a problem in that it is difficult to assemble the sprocket because of a narrow assembly space.

SUMMARY

An object of an embodiment of the present disclosure is to provide a connection plate configured to support a portion between a drive unit and a sprocket, which may reduce cost required to replace a damaged component, and a traveling body for a dozer including the same.

An embodiment of the present disclosure provides a connection plate, which is disposed between a drive unit configured to provide power to a traveling body for a dozer and a sprocket configured to rotate by receiving power of the drive unit, the connection plate including: a body having a through-hole in which one region of the drive unit is penetratively disposed; a first support portion formed at one side of the body and configured to support the sprocket; and a second support portion formed at the other side of the body and configured to support the drive unit.

The connection plate may further include a connection portion configured to connect the first support portion and the second support portion.

The connection portion may be inclined from the second support portion toward the first support portion.

A thickness of the second support portion based on a direction parallel to a central axis of the through-hole may be relatively larger than a thickness of the first support portion based on the direction parallel to the central axis of the through-hole.

The connection plate may further include: first fastening holes formed through the first support portion such that first fastening members configured to fasten the sprocket and the first support portion are coupled to the first fastening holes; and second fastening holes formed through the second support portion such that second fastening members configured to fasten the drive unit and the second support portion are coupled to the second fastening holes.

The number of first fastening holes may be larger than the number of second fastening holes.

Another embodiment of the present disclosure provides a traveling body for a dozer, which is installed on a main body of a dozer and guides traveling of the dozer, the traveling body including: a drive unit configured to provide power to the dozer; a sprocket configured to engage with a link pin; and an annular connection plate configured to transmit power provided by the drive unit to the sprocket spaced apart from the drive unit.

The sprocket may include: a first sprocket segment supported on a part of the connection plate; and a second sprocket segment supported on a relatively larger region of an outer periphery of the connection plate than the first sprocket segment.

The first and second sprocket segments may be alternately supported on the connection plate.

An inner peripheral surface of the connection plate may be in contact with one region of an outer peripheral surface of the drive unit.

One surface of a drive unit flange, which faces the connection plate, protrudes from the drive unit, and is disposed adjacent to a surface where the inner peripheral surface of the connection plate adjoins one region of the outer peripheral surface of the drive unit, and one surface of the sprocket facing the connection plate may be disposed on the same axis.

Still another embodiment of the present disclosure provides a traveling body for a dozer, which is installed on a main body of a dozer and guides traveling of the dozer, the traveling body including: a drive unit configured to provide power to the dozer; a sprocket configured to engage with a link pin; and a connection plate, in which the connection plate includes: a body having a through-hole in which one region of an outer peripheral surface of the drive unit is penetratively disposed, the through-hole having an inner peripheral surface being in contact with and supported on one region of the outer peripheral surface of the drive unit, the body having one surface that faces one surface of the sprocket and faces a drive unit flange protruding from the drive unit and disposed adjacent to a surface adjoining one region of the outer peripheral surface of the drive unit; a first support portion disposed at one side of the other surface of the body and configured to support the sprocket; a second support portion disposed at the other side of the other surface and configured to support the drive unit; and a connection portion disposed between the first support portion and the second support portion and inclined in a direction toward the first support portion and the sprocket.

According to the embodiment of the present disclosure, the connection plate and the traveling body for a dozer including the same may effectively provide a degree of freedom in fastening and assembling the sprocket while supporting the drive unit and the sprocket spaced apart from each other.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
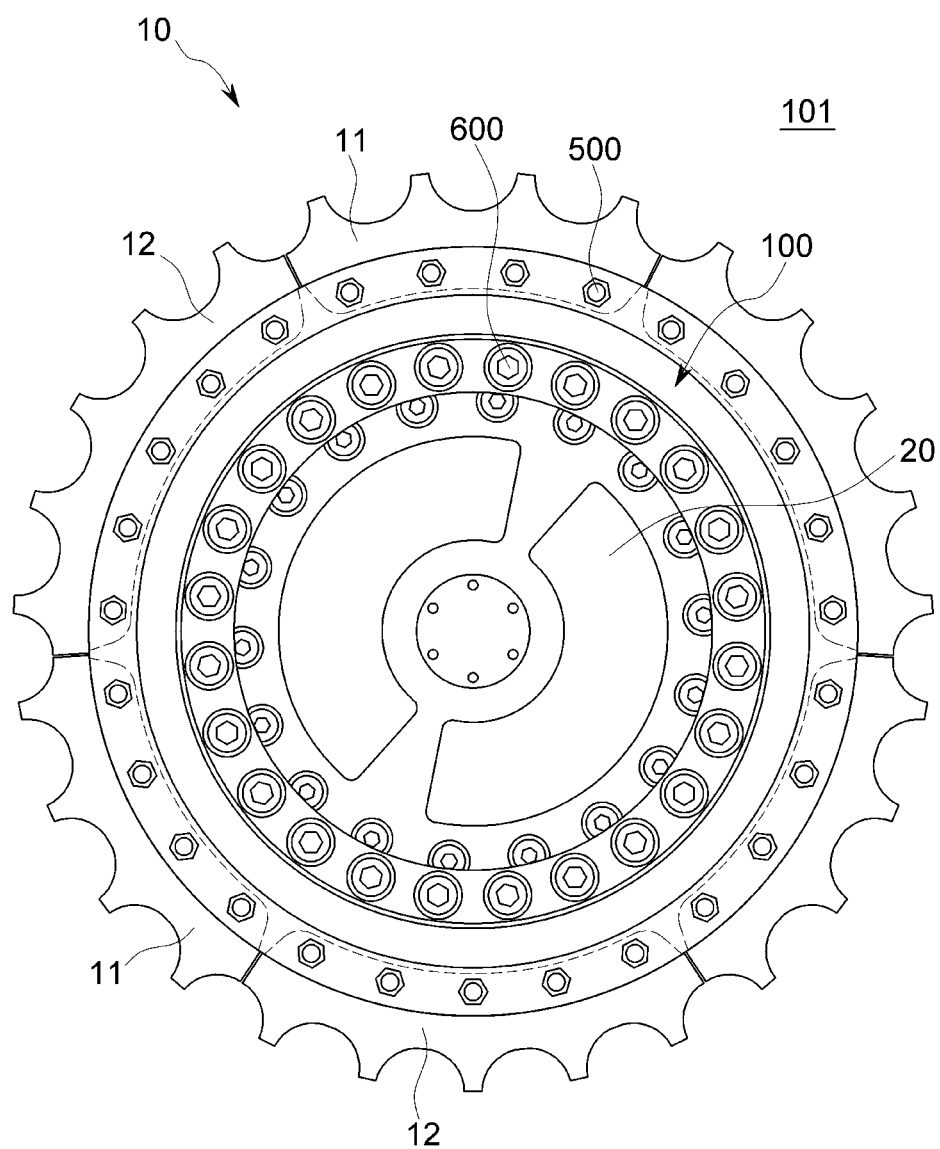
FIG. 1 is a view illustrating a connection plate according to an embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways, and is not limited to the embodiments described herein.

It is noted that the drawings are schematic and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Embodiments of the present disclosure illustrate ideal embodiments of the present disclosure in detail. As a result, various modifications of the drawings are expected. Therefore, the embodiments are not limited to specific forms in regions illustrated in the drawings, and for example, include modifications of forms by the manufacture thereof.

Hereinafter, a connection plate 101 according to an embodiment of the present disclosure will be described with reference to FIGS. 1 to 4.

Figure 2:
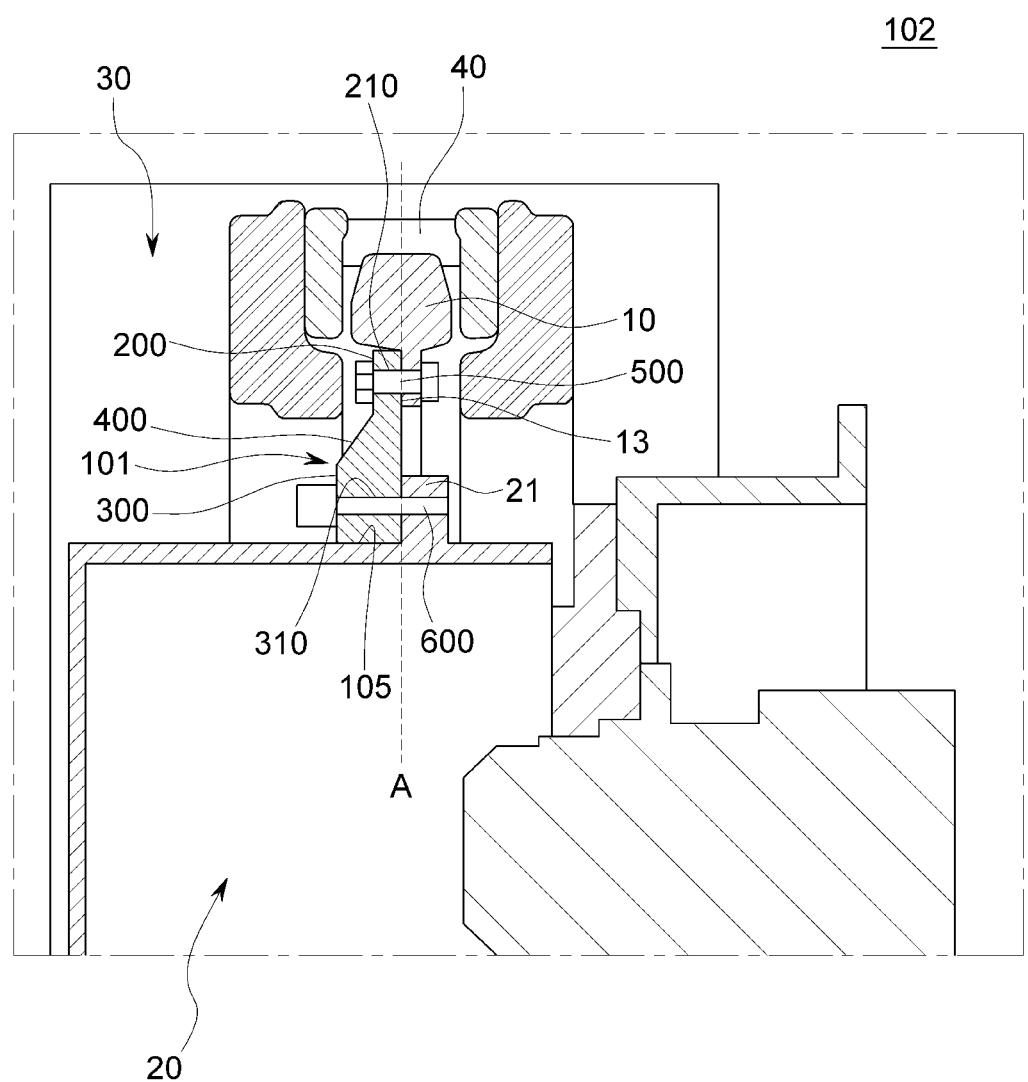
FIG. 2 is a view illustrating a cross-section of a part of a traveling body for a dozer.
Figure 3:
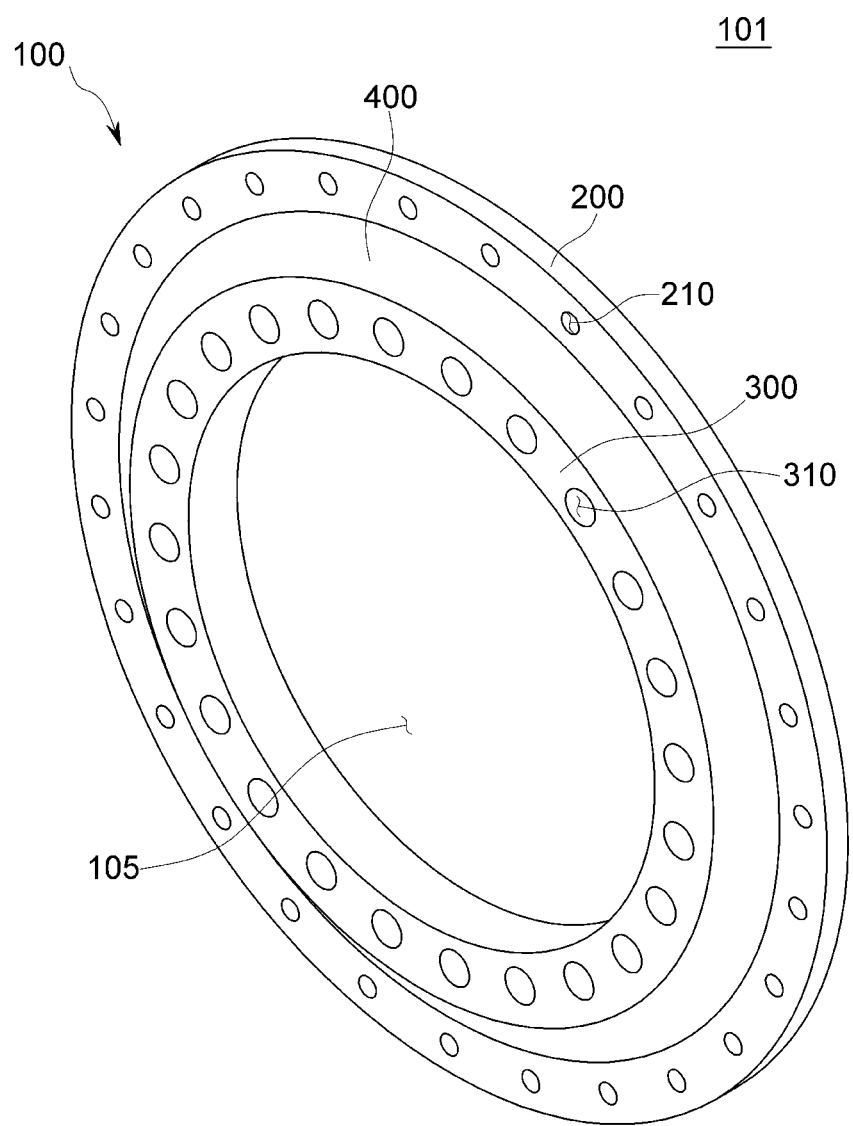
FIG. 3 is a perspective view of the connection plate illustrated in FIG. 1.

As illustrated in FIGS. 1 and 2, the connection plate 101 is disposed between a sprocket 10 and a drive unit 20 configured to provide power to a traveling body 102 for a dozer. Specifically, the traveling body 102 for a dozer is a lower body for a dozer, i.e., an apparatus configured to travel on the ground surface. In addition, the traveling body is installed below a main body of a dozer, and the traveling body guides the traveling of the dozer. That is, the traveling body has a track being in contact with the ground surface and guides the traveling of the dozer.

The drive unit 20 provides power to the traveling body 102 for a dozer. Specifically, the drive unit 20 may provide power to a traveling motor to rotate an endless track 30 of the traveling body 102 for a dozer.

The sprocket 10 transmits power to rotate the track 30 while being rotated by power provided from the drive unit 20.

As illustrated in FIGS. 1 to 4, the connection plate 101 includes a body 100, a first support portion 200, and a second support portion 300.

The body 100 may have an annular shape having a through-hole 105 therein. Specifically, the through-hole 105 may be formed in a central portion of the body 100, and the through-hole 105 may provide a space in which one region of the drive unit 20 is penetratively disposed. In addition, a part of the traveling motor may penetrate the through-hole 105 and be supported in the through-hole 105.

That is, an inner peripheral surface 106 of the through-hole 105 of the body 100 may come into contact with and be supported on one region of an outer peripheral surface of the drive unit 20.

The first support portion 200 may be formed at one side of the body 100 and support the sprocket 10. Specifically, the first support portion 200 may be provided relatively adjacent to an outer side of the through-hole 105 and configured to support the sprocket 10. That is, the first support portion 200 may be a region of the body 100 that supports the sprocket 10.

The second support portion 300 may be provided at the other side of the body 100. Specifically, the second support portion 300 may be disposed to be relatively closer to the through-hole 105 than is the first support portion 200, such that the second support portion 300 may support the drive unit 20. That is, the second support portion 300 may be another region of the body 100 that supports the drive unit 20. For example, the second support portion 300 may be coupled to a flange portion of the traveling motor and support the drive unit 20.

Therefore, the connection plate 101 according to the embodiment of the present disclosure may allow the drive unit 20 and the sprocket 10 to be spaced apart from each other at a distance and effectively transmit power of the drive unit 20 to the sprocket 10. That is, the connection plate 101 may support the sprocket 10 and the drive unit 20 while spacing the sprocket 10 and the drive unit 20. Therefore, it is possible to effectively prevent a problem that the entire drive unit needs to be replaced when damage occurs in a case in which the sprocket and the drive unit are coupled directly.

The connection plate 101 according to the embodiment of the present disclosure may further include a connection portion 400.

Figure 4:
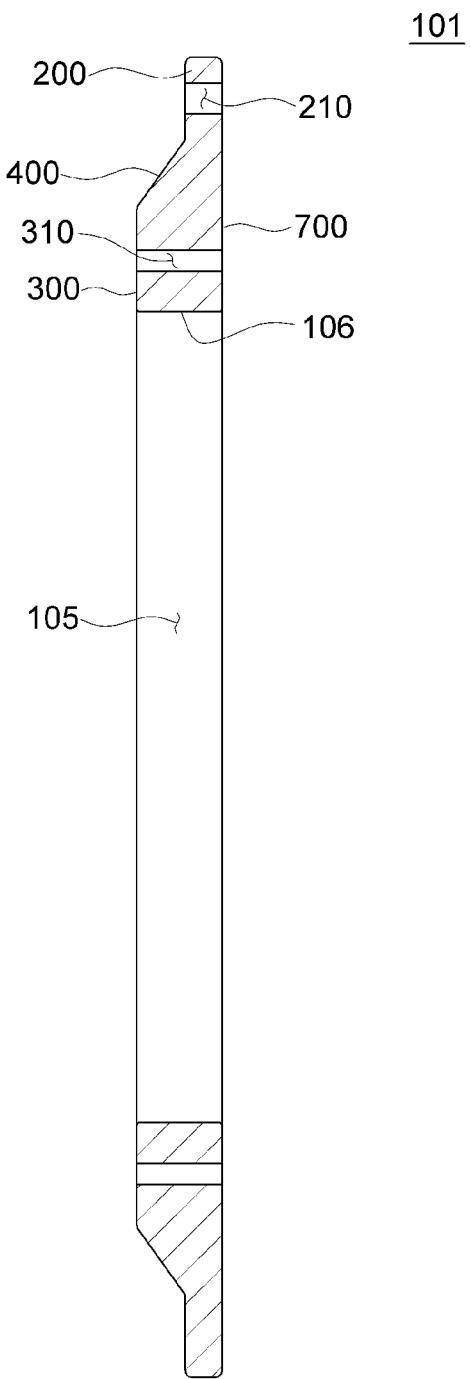
FIG. 4 is a cross-sectional view of the connection plate illustrated in FIG. 3.

As illustrated in FIGS. 2 and 4, the connection portion 400 may be provided on the body 100 and disposed between the first support portion 200 and the second support portion 300. The connection portion 400 may define a spacing distance between the first support portion 200 and the second support portion 300. Specifically, the connection portion 400 may connect the first support portion 200 and the second support portion 300 so that the first support portion 200 and the second support portion 300 are spaced apart from each other radially.

The connection portion 400 may provide a degree of freedom and an assembly space for assembling the sprocket 10 supported by the first support portion 200, and a degree of freedom and an assembly space for coupling with the drive unit 20 supported by the second support portion 300.

That is, the connection plate 101 according to the present disclosure may effectively solve the problem of a low degree of freedom that occurs in the case in which the drive unit and the sprocket are connected directly.

In the case of various models different in length from the through-hole 105 of the connection portion 400 to the outer periphery of the body 100 and inner and outer diameters of the connection plate 101, it is possible to effectively and easily connect the drive unit 20 and the sprocket 10 even though the size of the drive unit 20 and the size of the sprocket 10 vary depending on specifications of the dozer.

The connection portion 400 according to the embodiment of the present disclosure may be inclined.

The connection portion 400 may be inclined from the second support portion 300 to the first support portion 200. Specifically, the connection portion 400 may be formed to have an angular gradient in a direction from the second support portion 300 toward the first support portion 200, thereby effectively preventing interference between the sprocket 10 supported on the first support portion 200 and the first support portion 200 and between the sprocket 10 and the connection portion 400. That is, the connection portion 400 may be inclined in a direction from the second support portion 300 toward the first support portion 200 and the sprocket 10.

The first and second support portions 200 and 300 of the connection plate 101 according to the embodiment of the present disclosure may have different thicknesses, as illustrated in FIGS. 2 and 4.

The thickness of the first support portion 200 may be defined as a length of the first support portion 200 in a direction parallel to a center of the through-hole 105 formed in the body 100.

The thickness of the second support portion 300 may be defined as a length of the second support portion 300 in the direction parallel to the center of the through-hole 105 formed in the body 100.

The thickness of the second support portion 300 may be relatively larger than the thickness of the first support portion 200. Therefore, the second support portion 300 may safely transmit power of the drive unit 20, and the first support portion 200 may increase a degree of freedom in coupling with the sprocket 10.

The connection portion 400 may connect the first and second support portions 200 and 300 inclined to have different thicknesses.

The difference in thickness may improve rigidity of the connection plate 101 and effectively improve a degree of freedom in coupling with the sprocket 10. Further, it is possible to effectively reduce a weight of the connection plate 101.

The connection plate 101 according to the embodiment of the present disclosure may further include first and second fastening holes 210 and 310.

The first fastening hole 210 may be formed in the first support portion 200. In addition, first fastening members 500 may be inserted into the first fastening holes 210, such that the sprocket 10 and the connection plate 101 may be fastened. Further, the plurality of first fastening holes 210 may be formed in the first support portion 200 and spaced apart from one another in a circumferential direction of the body 100.

The second fastening hole 310 may be formed in the second support portion 300. In addition, second fastening members 600 may be inserted into the second fastening holes 310, such that the drive unit 20 and the connection plate 101 may be fastened. Further, the plurality of second fastening holes 310 may be formed in the second support portion 300 and spaced apart from one another in a circumferential direction of the through-hole 105 of the body 100.

As illustrated in FIG. 1, the number of first fastening holes 210 formed in the connection plate 101 may be relatively larger than the number of second fastening holes 310.

Therefore, the connection plate 101 may effectively support the sprocket 10 and the drive unit 20 while spacing the sprocket 10 and the drive unit 20 and effectively transmit power of the drive unit 20 to the sprocket 10.

A drive unit flange 21 may protrude from an outer peripheral surface of the drive unit 20. At least a part of the second fastening member 600 is inserted into the drive unit flange 21 so that the connection plate 101 and the drive unit 20 are fastened and supported.

Specifically, as illustrated in FIGS. 2 and 4, the inner peripheral surface 106 of the through-hole 105 of the connection plate 101 is in contact with one region of an outer peripheral surface of the drive unit 20. In addition, one region of the outer peripheral surface of the drive unit 20, which is in contact with the inner peripheral surface 106 of the through-hole 105, is disposed adjacent to one surface of the drive unit flange 21.

Therefore, one region of the connection plate 101 faces one surface of the drive unit flange 21, and the other region of the connection plate 101 faces one surface of the sprocket 10. Specifically, one surface of the body 100 of the connection plate 101, which faces one surface of the drive unit flange 21 and faces one surface of the sprocket 10, may be supported by the first and second fastening members 500 and 600 and formed as a flat surface. In addition, the connection portion 400 may be formed on the other surface of the body 100 of the connection plate 101.

That is, as illustrated in FIG. 2, one surface of the drive unit flange 21 facing the connection plate 101 and one surface of the sprocket 10 facing the connection plate 101 may be disposed side by side on the same axis A.

With this configuration, the connection plate 101 according to the embodiment of the present disclosure may effectively increase a spacing distance between the sprocket 10 and the drive unit 20 in a narrow space, improve power transmission between the sprocket 10 and the drive unit 20, and improve a degree of assembly freedom required to fasten the sprocket 10.

Hereinafter, the traveling body 102 for a dozer according to the embodiment of the present disclosure will be described with reference to FIGS. 1 to 4.

The traveling body 102 for a dozer may further include link pins 40, the drive unit 20, the sprocket 10, and the connection plate 101.

The link pins 40 may connect a plurality of tracks 30 and engage with teeth of the sprocket 10. Further, as the link pins 40 and the sprocket 10 engage with one another, the traveling body 102 for a dozer may be moved by the rotation of the sprocket 10.

The drive unit 20, the sprocket 10, and the connection plate 101 may be identical to those described above.

For example, the sprocket 10 may include segments separated as a plurality of parts. Specifically, the sprocket 10 may include first and second sprocket segments 11 and 12 having different sizes. The first sprocket segments 11 may be supported on a part of an outer portion of the connection plate 101. In addition, the second sprocket segments 12 may be supported on a relatively larger region of the outer periphery of the annular connection plate 101 than the first sprocket segment 11. As illustrated in FIG. 1, the first sprocket segment 11 is coupled to the connection plate 101 by means of the four first fastening members 500, and the second sprocket segment 12 is coupled to the connection plate 101 by means of the five first fastening members 500.

The plurality of first sprocket segments 11 and the plurality of second sprocket segments 12 may be alternately supported on the outer portion of the connection plate 101.

For example, as illustrated in FIG. 1, the sprocket 10 may include three first sprocket segments 11 and three second sprocket segments 12.

Therefore, in the traveling body 102 for a dozer according to the embodiment of the present disclosure, the connection plate 101 may connect the drive unit 20 and the sprocket 10 while spacing the drive unit 20 and the sprocket 10. Therefore, when the component between the sprocket 10 and the connection plate 101 is damaged, only the connection plate 101 may be easily replaced. That is, it is possible to eliminate the inconvenience, time, and costs required to replace the drive unit in the related art.

While the embodiments of the present disclosure have been described with reference to the accompanying drawings, those skilled in the art will understand that the present disclosure may be carried out in any other specific form without changing the technical spirit or an essential feature thereof.

Accordingly, it should be understood that the aforementioned embodiments are described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A connection plate, which is disposed between a drive unit configured to provide power to a traveling body for a dozer and a sprocket configured to rotate by receiving power of the drive unit, the connection plate comprising:
   a body having a through-hole in which one region of the drive unit is penetratively disposed;
   a first support portion formed at one side of the body and configured to support the sprocket; and
   a second support portion formed at the other side of the body and configured to support the drive unit,
   wherein a thickness of the second support portion based on a direction parallel to a central axis of the through-hole is relatively larger than a thickness of the first support portion based on the direction parallel to the central axis of the through-hole.

2. The connection plate of claim 1, further comprising:
   a connection portion configured to connect the first support portion and the second support portion.

3. The connection plate of claim 2, wherein the connection portion is inclined from the second support portion toward the first support portion.

4. The connection plate of claim 1, further comprising:
   first fastening holes formed through the first support portion such that first fastening members configured to fasten the sprocket and the first support portion are coupled to the first fastening holes; and
   second fastening holes formed through the second support portion such that second fastening members configured to fasten the drive unit and the second support portion are coupled to the second fastening holes.

5. The connection plate of claim 4, wherein the number of first fastening holes is larger than the number of second fastening holes.

6. A traveling body for a dozer, which is installed on a main body of a dozer and guides traveling of the dozer, the traveling body comprising:
   a drive unit configured to provide power to the dozer;
   a drive unit flange protrudes from an outer peripheral surface of the drive unit;
   a sprocket configured to engage with a link pin; and
   an annular connection plate, wherein a surface facing the drive unit flange and a surface of sprocket facing the surface are disposed on the same axis, and a power provided by the drive unit is transmitted to the sprocket spaced apart from the drive unit.

7. The traveling body of claim 6, wherein the sprocket comprises:
   a first sprocket segment supported on a part of the connection plate; and
   a second sprocket segment supported on a relatively larger region of an outer periphery of the connection plate than the first sprocket segment.

8. The traveling body of claim 7, wherein the first and second sprocket segments are alternately supported on the connection plate.

9. The traveling body of claim 6, wherein an inner peripheral surface of the connection plate is in contact with one region of an outer peripheral surface of the drive unit.

10. A traveling body for a dozer, which is installed on a main body of a dozer and guides traveling of the dozer, the traveling body comprising:
   a drive unit configured to provide power to the dozer;
   a sprocket configured to engage with a link pin; and
   a connection plate,
   wherein the connection plate comprises:
   a body having a through-hole in which one region of an outer peripheral surface of the drive unit is penetratively disposed, the through-hole having an inner peripheral surface being in contact with and supported on one region of the outer peripheral surface of the drive unit, the body having one surface that faces one surface of the sprocket and faces a drive unit flange protruding from the drive unit and disposed adjacent to a surface adjoining one region of the outer peripheral surface of the drive unit;
   a first support portion disposed at one side of the other surface of the body and configured to support the sprocket;
   a second support portion disposed at the other side of the other surface and configured to support the drive unit and a thickness of the second support portion formed to be relatively lager than a thickness of the first support portion; and
   a connection portion disposed between the first support portion and the second support portion and inclined in a direction toward the first support portion and the sprocket.

* * * * *